United States Patent
Campbell et al.

(10) Patent No.: US 6,171,174 B1
(45) Date of Patent: Jan. 9, 2001

(54) SYSTEM AND METHOD FOR CONTROLLING A MULTI-ARM POLISHING TOOL

(75) Inventors: William Jarrett Campbell; Christopher Henry Raeder, both of Austin; Michael Lee Miller, Cedar Park, all of TX (US)

(73) Assignee: Advanced Micro Devices, Sunnyvale, CA (US)

(*) Notice: Under 35 U.S.C. 154(b), the term of this patent shall be extended for 0 days.

(21) Appl. No.: 09/105,980

(22) Filed: Jun. 26, 1998

(51) Int. Cl.[7] ............................. B24B 49/00; B24B 51/00
(52) U.S. Cl. .................................. 451/5; 451/41; 451/287
(58) Field of Search ................................. 451/10, 5, 11, 451/9, 41, 63, 285, 287, 288, 289

(56) References Cited

U.S. PATENT DOCUMENTS

| 5,653,622 | 8/1997 | Drill et al. |
| 5,655,951 | 8/1997 | Meikle et al. |
| 5,665,199 | 9/1997 | Sahota et al. |
| 5,696,601 | 12/1997 | Kodera et al. |
| 5,730,642 | 3/1998 | Sandhu et al. |
| 5,827,111 | * 10/1998 | Ball .................................... 451/11 |
| 5,865,666 | * 2/1999 | Nagahara ........................... 451/10 |

FOREIGN PATENT DOCUMENTS 0 770 455 A1   5/1997   (EP).

* cited by examiner

*Primary Examiner*—Derris H. Banks (57) ABSTRACT

A system and method for controlling a polishing tool having multiple arms is provided. In accordance with one embodiment, a first removal rate for each arm based on a first wafer run is determined. A downforce adjustment input for each arm is then determined based on a process model, for the arms, which relates a removal rate for a given arm to downforce adjustments on each of the arms and using each first removal rate. The downforce adjustment input for each arm is provided to the polishing tool for polishing a subsequent run. In this manner, the method takes into account each arms removal rate dependency on the downforce adjustments for all of the arms. This can provide reduced removal rate variations between arms as well as between wafer lots and improve the characteristics of the ultimately formed semiconductor devices.

28 Claims, 8 Drawing Sheets

SYSTEM AND METHOD FOR CONTROLLING A MULTI-ARM POLISHING TOOL

The United States Government has a paid-up license in this invention and the right in limited circumstances to require the patent owner to license others on reasonable terms as provided for by the terms of Award No. 70NANB6H2002 awarded by the U.S. Department of Commerce, National Institute of Standards and Technology.

FIELD OF THE INVENTION

The present invention relates generally to the planarization of semiconductor wafers and, more specifically, to a system and method for controlling a polishing tool having multiple arms.

BACKGROUND OF THE INVENTION

Chemical-mechanical polishing (CMP) is a widely used means of planarizing silicon dioxide as well as other types of layers on semiconductor wafers. Chemical mechanical polishing typically utilizes an abrasive slurry disbursed in an alkaline or acidic solution to planarize the surface of the wafer through a combination of mechanical and chemical action. A typical chemical mechanical polishing tool includes a rotatable circular platen or table on which a polishing pad is mounted and a polishing device is positioned above the pad. The polishing device includes one or more rotating carrier heads to which wafers can be secured typically through the use of vacuum pressure. In use, the platen is rotated and an abrasive slurry is disbursed onto the polishing pad. Once the slurry has been applied to the polishing pad, a downforce is applied to each rotating carrier head to press its wafer against the polishing pad. As the wafer is pressed against the polishing pad, the surface of the wafer is mechanically and chemically polished.

As semiconductor devices are scaled down, the importance of chemical-mechanical planarization to the fabrication process increases. In particular, it becomes increasingly important to control removal rate variations between wafers. Variations in removal rates effect the thicknesses of layers being polished. Variations in layer thicknesses deleteriously impact subsequent fabrication steps, such as lithography, and degrade device performance. To further complicate matters, the complexity of polishing tools is also increasing. For example, chemical mechanical polish tools have moved from single-arm polishing tools to multi-arm polishing tools which can, for example, polish five wafers simultaneously. The use of multiple polishing arms further contributes to variations in removal rates between wafers. As a result of the increasing importance and complexity of chemical mechanical planarization, semiconductor manufacturers seek systems and methods for controlling chemical mechanical polish tools.

SUMMARY OF THE INVENTION

The present invention provides a system and method of controlling a polishing tool having multiple arms. A method, in accordance with one embodiment, includes determining a first removal rate for each arm based on a first wafer run, determining a downforce adjustment input for each arm based on a process model, for the arms, which relates a removal rate for a given arm to downforce adjustments on each of the arms and using each first removal rate, and providing the downforce adjustment input for each arm to the polishing tool for polishing a subsequent run. In this manner, the method takes into account each arm's removal rate dependency on the downforce adjustments for all of the arms. This can reduce removal rate variations between arms as well as between wafers and improve the characteristics of the ultimately formed semiconductor devices.

A polishing system, in accordance with another embodiment of the invention, includes a polishing tool having multiple arms and one or more metrology tools, connected to the polishing tool, for measuring pre- and post-polish thicknesses of layers on wafers. The polishing system further includes a controller coupled to the polishing tool and the one or more metrology tools. The controller is configured to receive measured pre-polish thicknesses and post-polish thicknesses of wafers of a first wafer run and determine a removal rate for each arm using the measured pre-polish and post-polish thicknesses, determine a downforce adjustment input for each arm based on a process model, for the arms, which relates a removal rate for a given arm to downforce adjustments on each of the arms and using each first removal rate, and provide the downforce adjustment input for each arm to the polishing tool for polishing a subsequent run.

The above summary of the present invention is not intended to describe each illustrated embodiment or implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention generally provides a system and method for controlling a polishing tool having multiple arms. The invention, in particular, provides techniques for controlling the removal rate of each arm taking into account the downforces applied by each of the arms. In this manner, removal rate variations between arms and between wafers can be reduced. While the invention is not so limited, a more thorough understanding of the invention will be achieved by reading the detailed description which follows.

Figure 1:
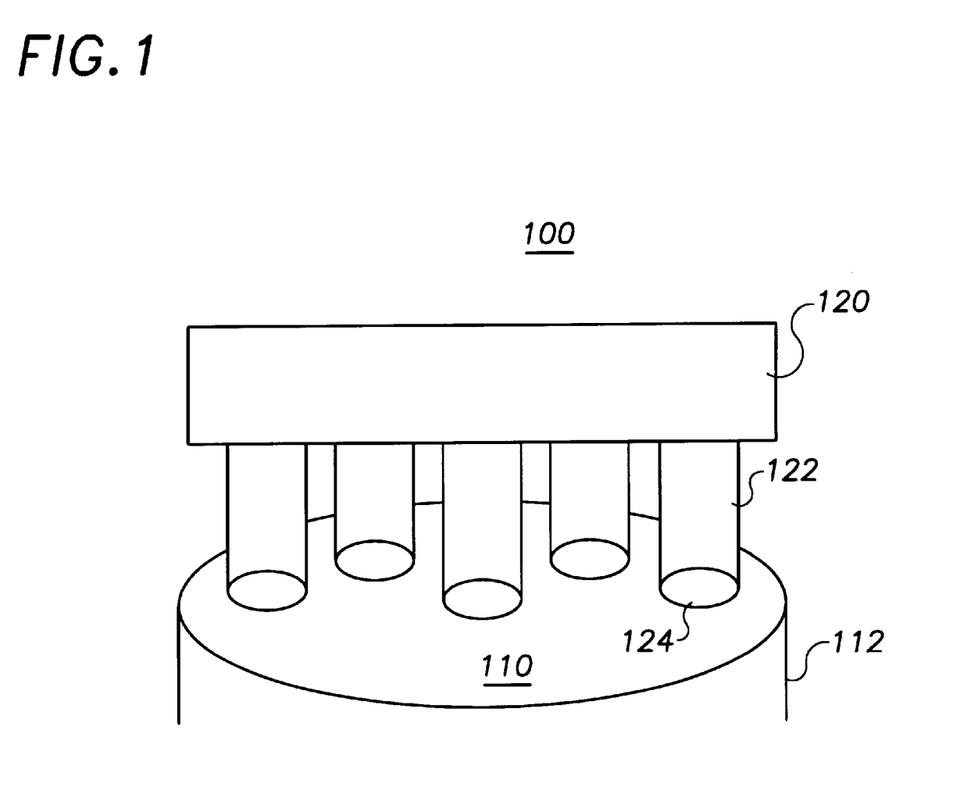
FIG. 1 illustrates a conventional polishing tool having multiple polishing arms.

By way of illustration, an exemplary multiple arm polishing tool is shown in FIG. 1. The exemplary polishing tool 100 generally includes a polishing pad 110 mounted on a platen 112 and a multi-head carrier 120 positioned above the polishing pad 110. The multi-head carrier 120 typically includes a plurality of rotatable polishing arms 122, each of which includes a head 124. Wafers can be secured to the carrier heads 124 by known techniques such as vacuum pressure. A source of polishing fluid (not shown) is also provided to supply polishing fluid to the pad 110 for polishing. It should be appreciated that the polishing tool 100 is illustrated by way of example only. Moreover, the illustration of a five arm polishing tool is also provided by way of example. The invention extends to cover the control of any multiple arm polishing tool having more than one arm.

To effectuate polishing, the platen 112 is rotated at a typically constant table speed and downforces are applied to each of the polishing arms for a predetermined time, based on expected removal rates. Conventionally, in order to control removal rate variations, the post-polishing thickness of the polished layers are measured and compared against a target post-polish thickness. When the difference in measured and target post-polish thickness exceeds a predetermined threshold, for any given arm, the polishing tool is taken out of production and the downforces on the arms are adjusted. These adjustments are determined by running a series of monitor wafers on the tool and applying different downforces on the arms to determine the removal rate of an individual arm based on the downforce applied to the individual arm. Then, the downforce on each arm is independently adjusted in attempt to re-center the process.

Figure 2:
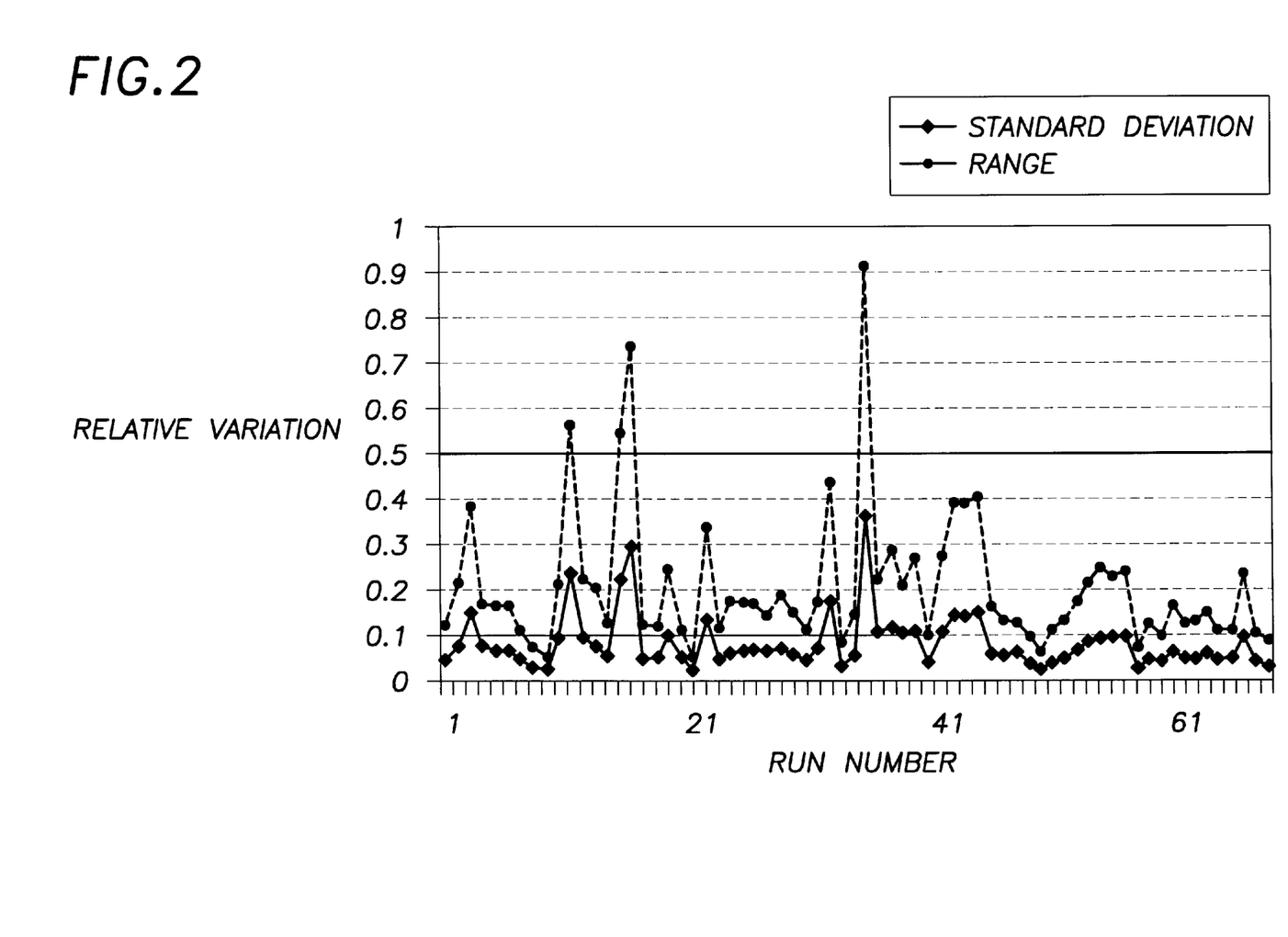
FIG. 2 is a graph illustrating arm-to-arm removal rate variation using conventional polishing techniques.

This conventional control process removes the tool for several hours and increases the cost of fabrication. This process further fails to account for significant factors which effect the removal rate of a given polishing arm. In particular, this process fails to account for removal rate variations resulting from interaction between the polishing arms. As a result, conventional polishing techniques suffer from significant arm-to-arm removal rate variations. By way of illustration, FIG. 2 is an exemplary graph depicting removal rate variations across the arms of a five-arm polishing tool using conventional polishing techniques. Specifically, FIG. 2 depicts the range and standard deviation of removal rates of the arms as a function of lot number. As can be seen, for a given wafer lot, removal rates between the arms can vary up to about 7 angstroms/second with a standard deviation of about 3 angstroms per second. Depending upon the polish time, such variations in removal rates can produce post-polish thicknesses varying by up to 20% from a target post-polish thickness. The present invention provides polish tool control techniques which account for arm-to-arm interaction and which can, for example, reduce arm-to-arm removal rate variations.

As has been determined, in multi-arm polishing tools, interaction between the polishing arms plays an important role in removal rate variations between the arms. In particular, a downforce adjustment to any one of the arms of a polishing tool will impact the physical condition of the polishing platen/pad resulting in changes in the polish characteristics, such as removal rates, of the other arms of the polishing tool. According to the invention, the interaction between the arms of a polishing tool having N arms may be modeled by the following relationship:

$$R_j = \frac{\Delta x}{\Delta t} j = \sum_{l=1}^{N} K_l \Delta F_l \qquad [1]$$

Where j represents a polish arm, $\Delta x$ represents the amount of material removed on the wafer of arm j, $\Delta t$ represents the polish time, $R_j$ represents the removal rate for polish arm j, $\Delta F_i$ represents the downforce adjustment (from a nominal downforce) for polish arm i and $K_i$ is a coefficient for polish arm i relating the downforce adjustment of polishing arm i ($\Delta F_i$) to the removal rate for polishing arm j ($R_j$).

The above relationship modeling the dependence of each arm removal rate on the downforces of each of the arms may be used to govern the control of polishing tools having more than one arm. A process model for a multi-arm a polish tool may be rewritten in deviation form as follows:

$$R_{k+1} = R_k + K\Delta F_k \qquad [2]$$

Where $R_{k+1}$ is a vector representing the removal rates at each arm for a run k+1, vector $R_k$ represents the removal rates for each arm at run k, $\Delta F_k$ is a vector representing the downforce adjustments for the arms and the coefficient matrix K defines the relationship between removal rate changes ($R_{k+1}-R_k$) and downforce adjustments $\Delta F_k$. It is noted that the downforce adjustment vector $\Delta F_k$ is input to the polishing tool at run k and applied to run k+1 to effect the removal rate vector $R_{k+1}$. As used herein, run identifies a group of one or more batches of wafers which are polished using the same downforce adjustments. The term wafer batch refers to a group of wafers loaded onto a polish arm. A wafer batch may include production as well as nonproduction wafers. The above process model advantageously takes into account the downforce adjustments on all of the arms in determining the change in removal rate for each arm and, in this manner, accounts for the interaction between the polishing arms.

Figure 3:
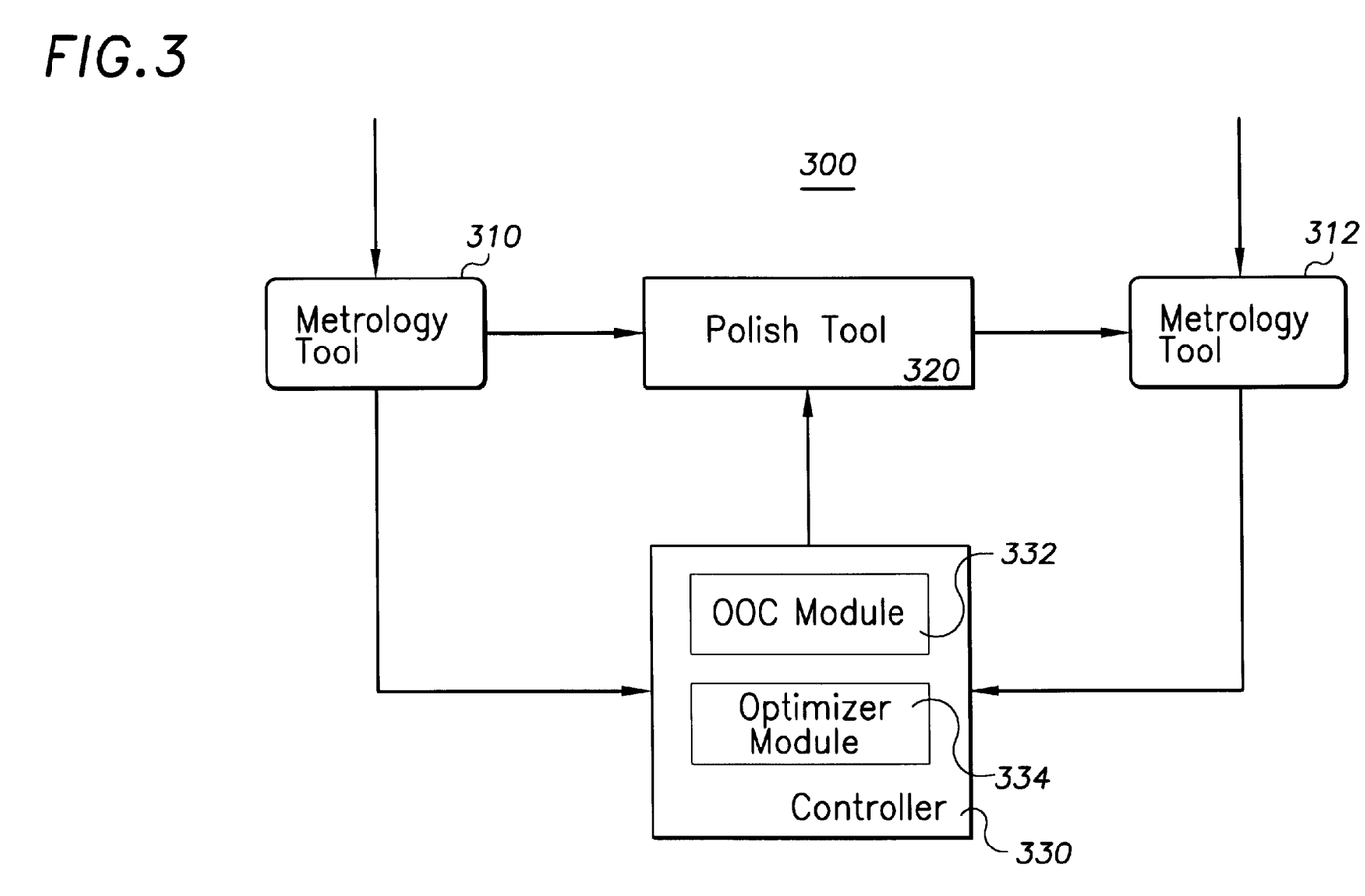
FIG. 3 illustrates an exemplary polishing system in accordance with one embodiment of the invention.

FIG. 3 illustrates an exemplary system for controlling a polish tool having multiple arms. The exemplary system 300 includes two metrology tools 310 and 312 for measuring pre-polish thicknesses and post-polish thicknesses of wafer layers (e.g., dielectric layers), respectively. It should be appreciated that while two metrology tools are illustrated, a single metrology tool may be used to perform both pre- and post-polish thickness measurements. The two metrology tools 310 and 312 are coupled to a polish tool 320. A suitable metrology tool for many applications is the Optiprobe metrology tool by Therma-Wave, Inc. The system further includes a controller 330 coupled to the polishing tool 320 for controlling the polishing tool. The controller 330 generally receives pre- and post-polish thickness measurements from the metrology tools 310 and 312 and uses the thickness measurements to control the polish tool 320. The exemplary controller 330 includes an "out of control" module (OOC module) 332 for determining when downforce adjustments to the polish tool 320 are needed, and an optimizer module 334 which, when the tool moves out of control, determines new downforce adjustments for the polish tool 320 using nonproduction wafer thickness data. The controller may, for example, be a model predictive controller implemented using, for example, MatLab Optimization Toolbox® routines. The controller 330 may be interfaced with the polish tool 320 using, for example, an Advance Process Control Framework interface.

Figure 4:
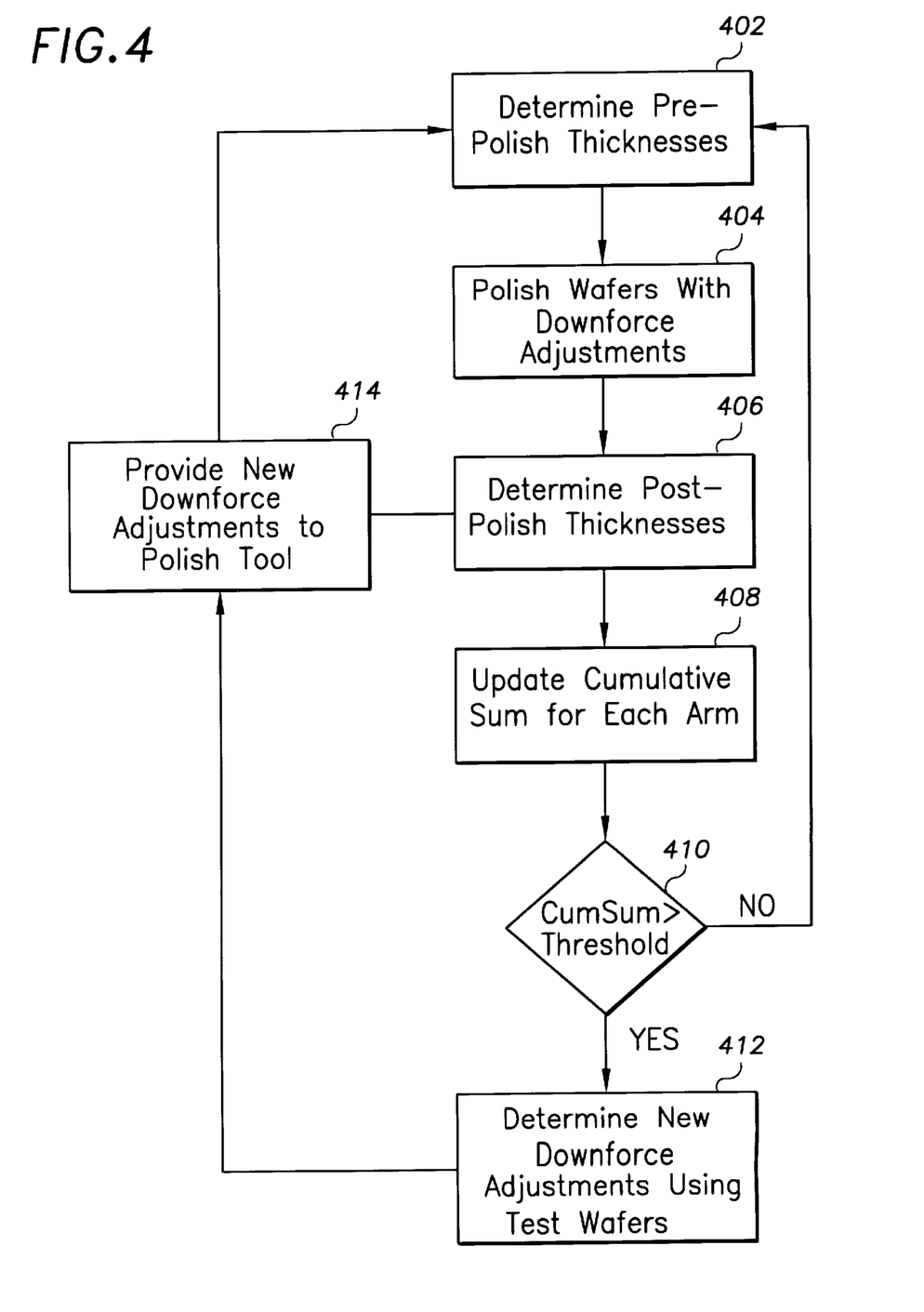
FIG. 4 is a flow chart illustrating an exemplary process for controlling a polishing tool in accordance with one embodiment of the invention.

An exemplary process flow for the system 300 is illustrated in FIG. 4. By way of example, this exemplary process will be illustrated using a five-arm polish tool 320. At block 402, a first wafer batch (e.g., five wafers for a five arm polish tool) is provided to the metrology tool 310 for measuring pre-polish thickness of the wafer layers to be polished. The pre-polish thicknesses are provided to the controller 330 and typically stored thereby. The batch of wafers is then loaded onto the carrier heads of the tool's polishing arms and the wafer batch is polished using a predetermined downforce adjustment for each arm, as indicated at block 404. The downforce adjustments may be either calculated by the optimizer module 334 at block 412 (as will be discussed below) or, for an initial run, predefined by an operator. The polishing is typically performed at a predetermined table speed and a selected time which, based on expected removal rate, provides for removal of a predetermined amount of material. The expected removal rate may be a mean predicted removal rate for the arms calculated by the optimizer module 334 (e.g., at block 412) and input to the polish tool 320. At block 406, the post-polish thicknesses of the wafer batch are determined and provided to the controller 320.

Figure 5:
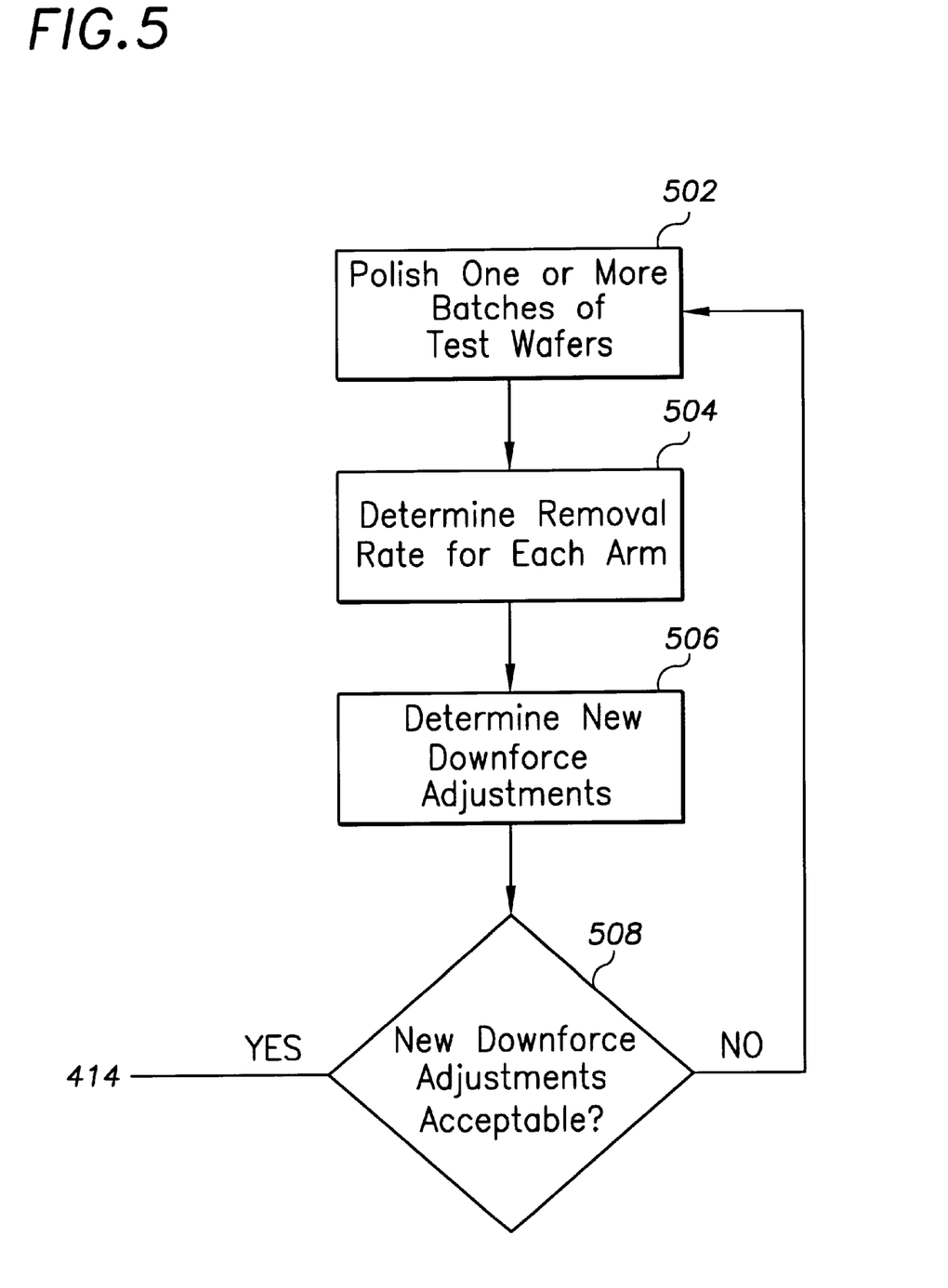
FIG. 5 is a flow chart illustrating an exemplary process for controlling a polishing tool in accordance with another embodiment of the invention.

At blocks 408 and 410, the OOC module 332 determines whether the polish process is out of control. In the illustrated embodiment, this is done by determining, for each arm, a difference between the post-polish thickness for the wafer of the arm and a target thickness and updating a cumulative sum (CUSUM) for the arm with the difference, as indicated at block 408. The OCC module 332 then checks to determine whether the CUSUM for any arm exceeds a predetermined threshold as indicated at block 410. If not, control moves to block 402 and another wafer batch is processed using the same downforce adjustments. If the CUSUM data for any arm exceeds the predetermined threshold, control moves to block 412 where the optimizer module 334 determines new downforce adjustments (which will be applied to a subsequent production wafer run) for the arms using nonproduct test wafers. The CUSUM for each arm is also reset. A mean predicted removal rate for the subsequent wafer run may also be determined using the new downforce adjustments. Details of block 410 are illustrated in FIG. 5. Control then moves to block 414 where the new downforce adjustments are provided to the polish tool 320. The mean predicted removal rate may also be provided to the polish tool 320 so the tool may calculate a polish time. Another wafer batch is then processed using downforces adjusted by the downforce adjustments determined by the optimizer module 334 at block 412.

FIG. 5 illustrates an exemplary process flow for determining downforce adjustments using test wafers. The test wafers may, for example, be bare silicon wafers with a relatively thick (e.g., 20,000 Angstrom) blanket layer of oxide on top. At block 502, one or more batches of test wafers are polished. The removal rate for each arm is then determined, as indicated at block 504. This is done using pre- and post-polish thickness measurements for the test wafer batch(es) and the polish time for each wafer batch. For example, the removal rate of a given arm may simply be the difference in post- and pre-polish thickness for the wafer polished by the arm divided by the polish time. The polish time may be provided to the controller 320 from the polish tool 320. Where multiple batches are polished, an average removal rate for each arm is determined. Using the optimizer module 334, new downforce adjustments for the arms are determined, as indicated at block 506. Typically, the optimizer module 334 solves an optimization equation using the removal rates determined at block 504 and a relationship between arm removal rates and arm downforce adjustments. Details of an exemplary optimization equation are discussed below. If desired, the new downforce adjustments may now be used for polishing production wafer batches. In the illustrated embodiment, a verification batch of test wafers is polished using the new downforce adjustments to verify a return to an "in-control" state. The verification may be performed by determining whether the difference between the post-polish thickness of any verification batch wafer layer and an expected thickness falls below a predetermined threshold. If not, control moves to block 414, where the new downforce adjustments are provided to the polish tool 320 for polishing a subsequent production wafer run. Otherwise, control returns to block 502 to recalculate new downforce adjustments.

As noted above, the new downforce adjustments are determined by solving an optimization equation. The optimization equation is typically dependent upon downforce adjustments and removal rates. One suitable optimization equation which minimizes the variance of predicted removal rates for a subsequent run is:

$$\min J(\Delta F_k) = [R_{k+1} - \overline{R}_{k+1}]^T [R_{k+1} - \overline{R}_{k+1}] \quad [3]$$

Where $\overline{R}_{k+1}$ is the mean of the predicted removal rates. The optimization equation [3] above may be solved to minimize the variation in predicted removal rates for run k+1 across the polish arms using the mean of the removal rates at run k as the desired mean removal rates for run k+1. In accordance with one embodiment of the invention, the downforce adjustment are determined using the optimization equation [3] subject to the process model [2] and operational constraints. The operational constraints may, for example, require that the sum of the downforce adjustments equals 0 ($\Sigma \Delta F_{k,i} = 0$) and/or that each downforce ($F_k = F_{nominal} + F_k$) is bound by an upper bound and a lower bound ($B_L \leq F_k \leq B_U$).

Incorporation of the process model:

$$R_{k+1} = R_k + K \Delta F_k \quad [4]$$

and process constraints:

$$\Sigma \Delta F_{k,i} = 0$$

$$B_L \leq F_k \leq B_U \quad [5]$$

into the optimization equation [3] and characterizing the optimization equation [3] in terms of downforce adjustments, yields the optimization equation set forth below.

$$\min J(\Delta F_k) = \Delta F_k^T K^T Q K \Delta F_k + 2 * \Delta F_k^T B^T Q R_k \quad [6]$$

subject to $$\begin{bmatrix} 1 & 1 & 1 & 1 & 1 \\ -1 & -1 & -1 & -1 & -1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ -1 & 0 & 0 & 0 & 0 \\ 0 & -1 & 0 & 0 & 0 \\ 0 & 0 & -1 & 0 & 0 \\ 0 & 0 & 0 & -1 & 0 \\ 0 & 0 & 0 & 0 & -1 \end{bmatrix} \Delta F_k \leq \begin{bmatrix} 0 \\ 0 \\ B_U - F_A \\ B_U - F_B \\ B_u - F_C \\ B_U - F_D \\ B_U - F_E \\ -B_L + F_A \\ -B_L + F_B \\ -B_L + F_C \\ -B_L + F_D \\ B_L + F_E \end{bmatrix}$$

where $$\Delta F_K = [\Delta F_A \quad \Delta F_B \quad \Delta F_C \quad \Delta F_D \quad \Delta F_E]_K^T$$

$$R_K = [R_A \quad R_B \quad R_C \quad R_D \quad R_E]_K^T$$

$$Q = \begin{bmatrix} .8 & -.2 & -.2 & -.2 & -.2 \\ -.2 & .8 & -.2 & -.2 & -.2 \\ -.2 & -.2 & .8 & -.2 & -.2 \\ -.2 & -.2 & -.2 & .8 & -.2 \\ -.2 & -.2 & -.2 & -.2 & .8 \end{bmatrix}$$

The optimization equation may then be solved for the downforce adjustments ($\Delta F_k$) for a subsequent run (k+1) using a predetermined coefficient matrix K and the removal rate vector for run k ($R_k$).

The coefficient matrix K can vary depending on the polishing tool as well as the layer being polished. For a given polishing tool, a coefficient matrix K may be determined using test wafers. For example, test wafers (e.g., bare silicon wafers with approximately 20,000 angstroms of deposited oxide) may be used to experimentally determine a coefficient matrix K for a polishing tool. This may be done by polishing a number of test wafer batches with a variety of downforce adjustments on each of the polishing arms and determining arm removal rates as a function of downforce adjustments using known techniques. One suitable technique includes using the auto-regressive with exogenous inputs (arx) modeling function provided in the MatLab™ system identification tool box.

Figure 6:
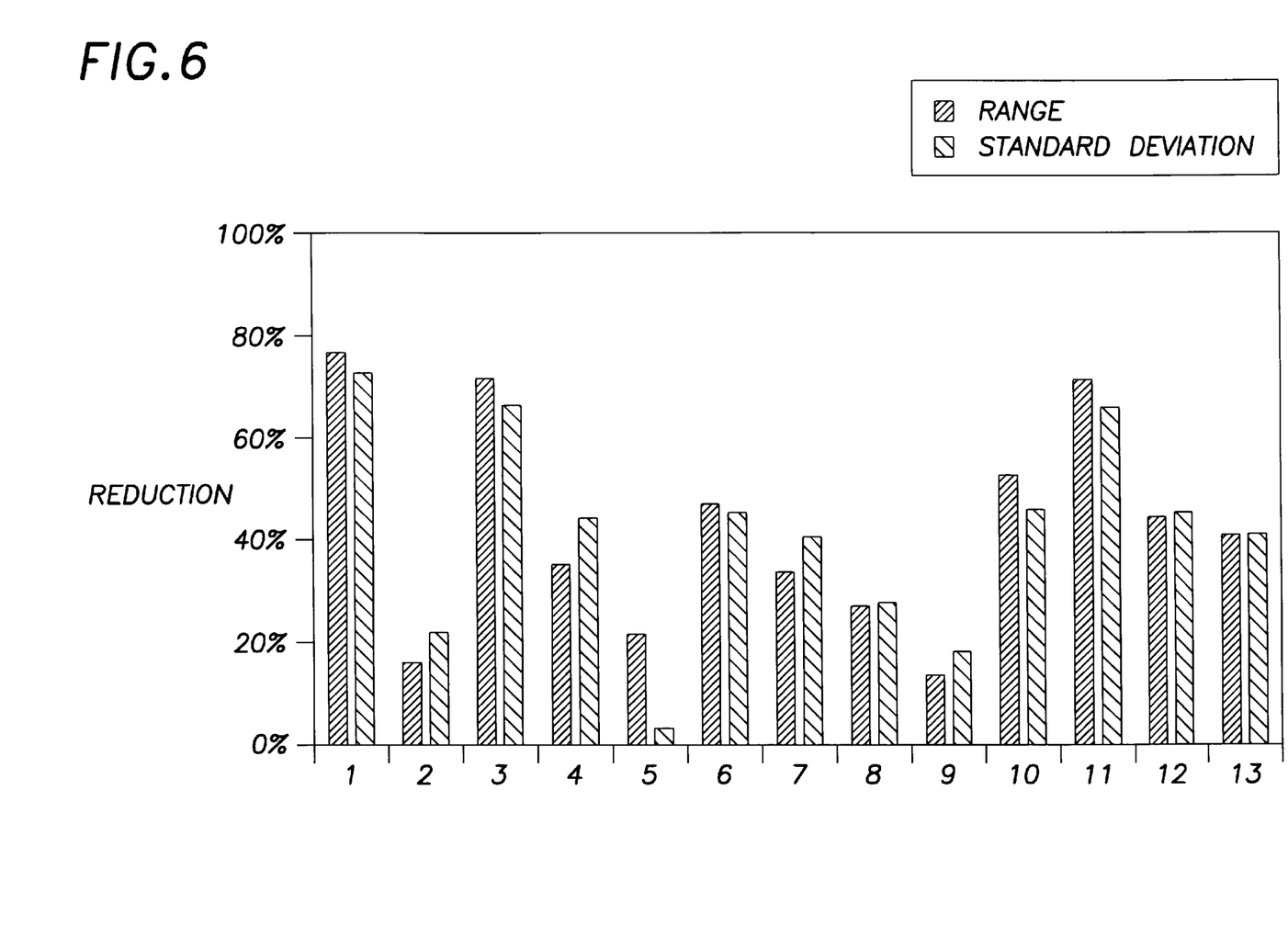
FIG. 6 illustrates performance benefits of an exemplary control system.

FIG. 6 is an exemplary graph illustrating the performance benefits of the control system and process illustrated in FIGS. 3–5 as compared to conventional controller techniques. Specifically, FIG. 6 shows the reduction in removal rate variation range and the reduction in standard deviation when using the control system and process illustrated in FIGS. 3–5 as compared to conventional controller techniques. As can be seen, the above described control system and process reduced both the range and standard deviation of removal rates for each trial. While the results were varied due to the large natural variation in the process, improvements were shown in each trial. In some, an average reduction of 42% in both range and standard deviation was seen over the 13 trial.

Figure 7:
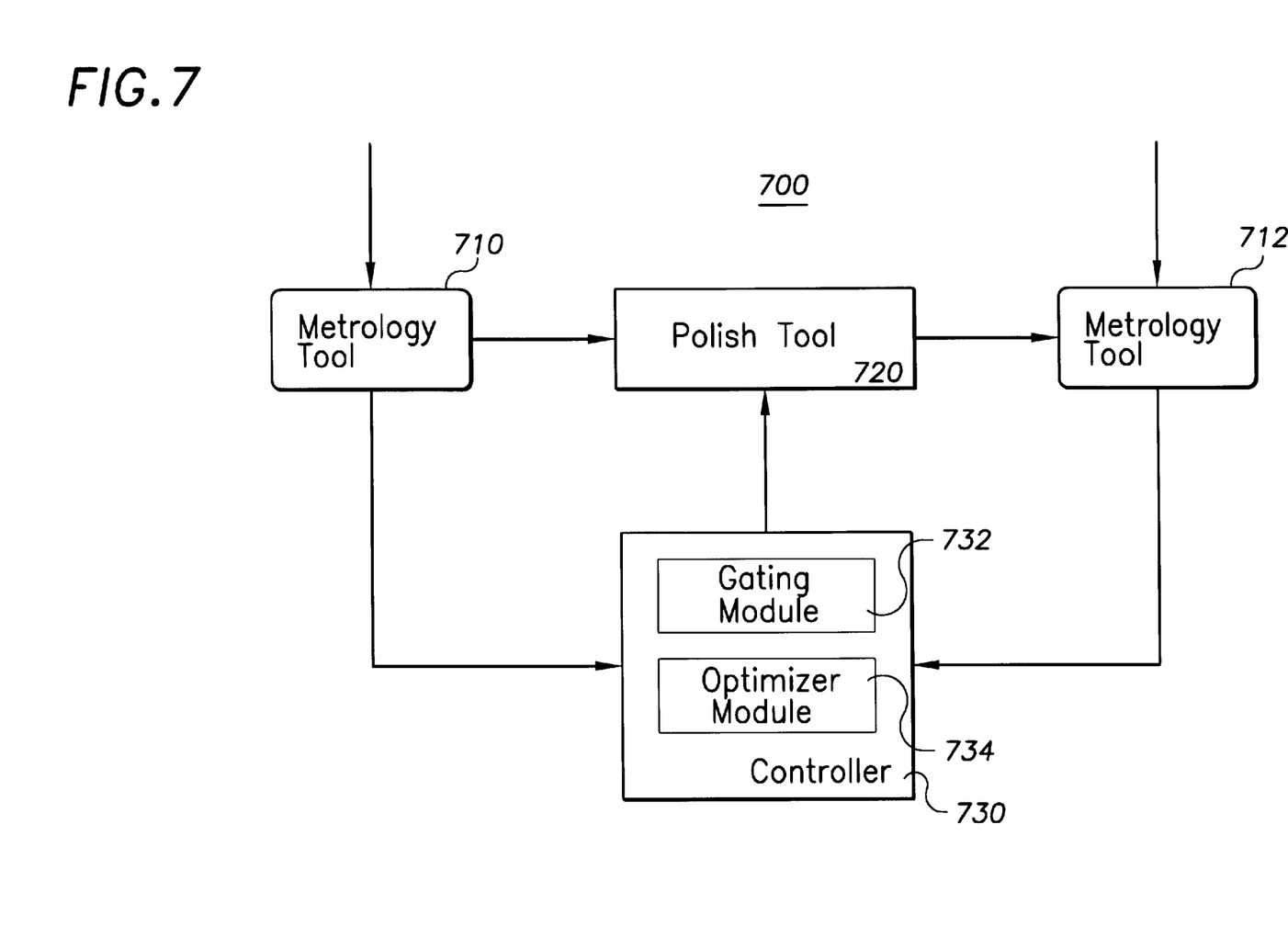
FIG. 7 illustrates an exemplary polishing system in accordance with yet another embodiment of the invention.

FIG. 7 illustrates another exemplary system for controlling a polish tool having multiple arms. The exemplary system 700 advantageously use production wafer data rather than test wafer data for controlling the downforce adjustment for each arm of a polish tool. The system 700 includes two metrology tools 710 and 712, coupled to a polish tool 720, for measuring pre-polish thicknesses and post-polish thicknesses, respectively. The system 700 further includes a controller 730 coupled to the polishing tool 720 for controlling the polishing tool based on production wafer thickness data. The controller 730 generally receives pre- and post-polish thickness measurements of production wafers from the metrology tools 710 and 712 and uses these thickness measurements to control the polish tool 720. The exemplary controller 730 may include a gating module 732 for determining when to adjust downforces of the polishing arms on the tool 720, and an optimizer module 734 which, when allowed by the gating module, determines downforce adjustments for the processing tool 720 based on production wafer thickness data. The controller 720 may, for example, be a model predictive controller implemented using, for example, MatLab Optimization Toolbox® routines and an Advance Process Control Framework interface.

Figure 8:
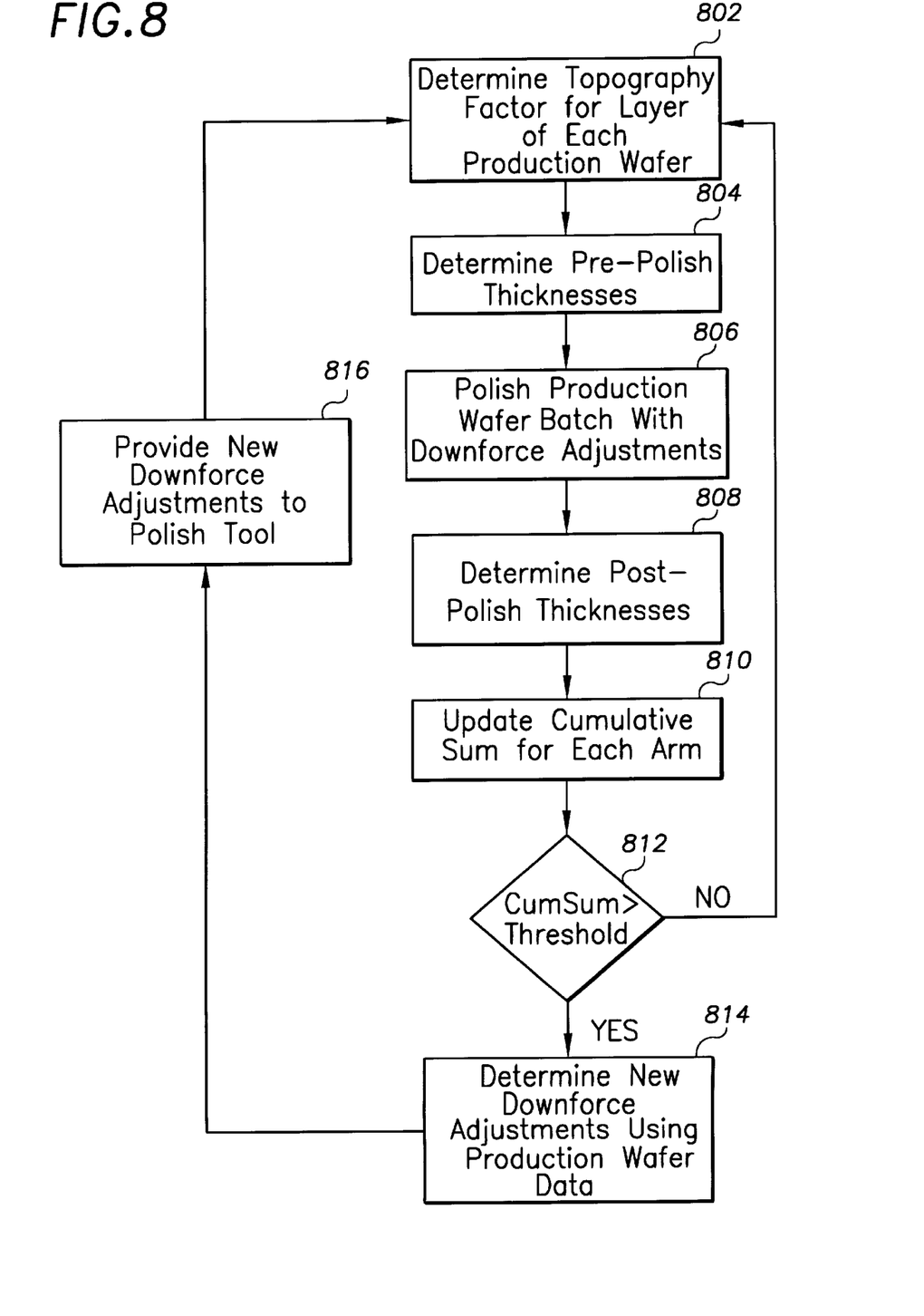
FIG. 8 is a flow chart illustrating an exemplary process for controlling a polishing tool in accordance with another embodiment of the invention.

An exemplary process flow for the system 700 is illustrated in FIG. 8. By way of illustration only, this process flow will also be described with reference to a five-arm polish tool 720. At block 802, a topology factor for each wafer layer of a first wafer batch (e.g., five wafers for a five arm polish tool) is provided to the controller 730. The topology factor, as will be discussed below, is a predetermined factor associated with each layer of a wafer which accounts for different coefficient matrices K for each wafer layer as compared to test wafers. At block 802, the first wafer batch is provided to the metrology tool 610 for measuring pre-polish thicknesses of the wafer layers to be polished. The pre-polish thicknesses are provided to the controller 730. The batch of wafers is then loaded onto the carrier heads of the tool's polishing arms and the wafers are polished using a downforce adjustment for each arm, as indicated at block 806. The downforce adjustments may either be calculated by the optimizer module 734 at block 814 (as will be discussed below) or, for an initial run, predefined, for example, by an operator. The polishing is typically performed at a predetermined table speed and a selected time which, based on expected removal rate, provides for removal of a predetermined amount of material. The expected removal rate may be a mean predicted removal rate calculated by the optimizer module 734 (e.g., at block 814) and input to the polish tool 720.

At block 808, the post-polish thicknesses of the wafer batch are determined and provided to the controller 720. Using the post and pre-polish thickness data, the gating module 722 updates a cumulative sum (CUSUM) chart for each arm, as indicated at block 810. The CUSUM chart may be updated by determining, for each arm, a difference between the post-polish thickness of the wafer polished by the arm and a target thickness and adding this difference to the CUSUM chart for the arm. The gating module then checks to determine whether the CUSUM chart for any arm exceeds a predetermined threshold, as indicated at block 812. If not, control moves to block 802 and another wafer batch is processed using the same downforce adjustment inputs. If the CUSUM chart for any arm exceeds the predetermined threshold, control moves to block 814 where the optimizer module 734 determines new downforce adjustments for the arms using production wafer topology factors and pre- and post-polish production wafer thickness data. The CUSUM chart for each arm is also reset. Typically, the optimizer module 734 solves an optimization equation (based on a process model for production wafers) using arm removal rates and a relationship between arm removal rates and arm downforce adjustments. The arm removal rates may be determined using post- and pre-polish thickness data for the production wafers and polish time as discussed above, for example. Where multiple batches are polished during a run, average removal rates for the arms may be used. Details of an exemplary optimization equation are discussed below. Control then moves to block 816 where the downforce adjustment inputs are provided to the polish tool 720. The mean predicted removal rate for the next run may also be provided so the polish tool can calculate polish time. Another run is then processed using downforces adjusted by the new downforce adjustment inputs.

The process model for controlling the polish tool using production wafer data is complicated due to the fact that each wafer layer to be polished is associated with a unique coefficient matrix K. To accommodate the different coefficient matrices found during production, the relationship between removal rates of production wafers and the removal rates of test or blanket wafers (e.g., bare silicon wafers with a blanket layer of oxide) may be modeled by the following relationship:

$$R_{product} = T_f * R_{blanket} \quad [7]$$

wherein $T_f$ is a topology factor associated with a given wafer layer and wafer. The topology factor $T_f$ for each layer of each wafer may be experimentally determined prior to implementing the control system. Using the topology model [7] above, a suitable process model for the control system may be $$R_{blanket,k+1} = R_{blanket,k} + K\Delta F_k \quad [8]$$

$$R_{product} = T_f * R_{blanket}$$

Using this process model, an optimization equation dependent upon downforce adjustments and removal rates may be determined. One optimization equation, which may be used by the controller, minimizes the variance of predicted removal rates at lot k+1 and is expresses as follows:

$$\min J(\Delta F_k) = [R_{blanket,k+1} - \overline{R}_{blanket,k+1}]^T [R_{blanket,k+1} - \overline{R}_{blanket,k+1}] \quad [9]$$

Where $\overline{R}_{blanket,k+1}$ is the mean of the predicted blanket removal rates at run k+1. The optimization equation [9] above may be solved to minimize the variation in predicted removal rates for run k+1 across the polish arms using the mean of the removal rates at run k as the desired mean removal rates for run k+1. In accordance with one embodiment of the invention, the downforce adjustments are determined using the optimization equation [9] subject to the process model [8] and operational constraints, such as ($\Sigma \Delta F_{k,i} = 0$) and ($B_L \leq F_k \leq B_U$).

Incorporation of the process model:

$$R_{blanket,k+1} = R_{blanket,k} + K\Delta F_k$$

$$R_{product} = T_f * R_{blanket} \quad [10]$$

and process constraints:

$$\Sigma \Delta F_{k,i} = 0 \quad [11]$$

$$B_L \leq F_k \leq B_U \quad [12]$$

and characterizing the optimization equation [9] in terms of downforce adjustments, yields the optimization equation set forth below.

$$\min J(\Delta F_k) = \Delta F_k^T K^T Q K \Delta F_k + 2 * \Delta F_k^T B^T Q R_{blanket,k} \quad [13]$$

subject to $$\begin{bmatrix} 1 & 1 & 1 & 1 & 1 \\ -1 & -1 & -1 & -1 & -1 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ -1 & 0 & 0 & 0 & 0 \\ 0 & -1 & 0 & 0 & 0 \\ 0 & 0 & -1 & 0 & 0 \\ 0 & 0 & 0 & -1 & 0 \\ 0 & 0 & 0 & 0 & -1 \end{bmatrix} \Delta F_k \leq \begin{bmatrix} 0 \\ 0 \\ B_U - F_A \\ B_U - F_B \\ B_u - F_C \\ B_U - F_D \\ B_U - F_E \\ -B_L + F_A \\ -B_L + F_B \\ -B_L + F_C \\ -B_L + F_D \\ B_L + F_E \end{bmatrix}$$

where $$\Delta F_K = [\Delta F_A \ \Delta F_B \ \Delta F_C \ \Delta F_D \ \Delta F_E]_K^T$$

$$R_K = [R_A \ R_B \ R_C \ R_D \ R_E]_K^T$$

$$Q = \begin{bmatrix} .8 & -.2 & -.2 & -.2 & -.2 \\ -.2 & .8 & -.2 & -.2 & -.2 \\ -.2 & -.2 & .8 & -.2 & -.2 \\ -.2 & -.2 & -.2 & .8 & -.2 \\ -.2 & -.2 & -.2 & -.2 & .8 \end{bmatrix}$$

The optimization function may be solved by the optimizer module 734 for the downforce adjustment ($\Delta F_k$) for a subsequent run (k+1) using a predetermined coefficient matrix K (e.g., for a blanket test wafer) and blanket removal rates at run k ($R_k$).

In another embodiment, the controller 730 uses a filter for reducing the process model incorporating a filter may be:

$$\hat{R}_{blanket,k+1} = \hat{R}_{blanket,k} + K\Delta F_k + \lambda[R_{product} - T_f * \hat{R}_{blanket,k}]$$

$$R_{product} = T_f * R_{blanket} \quad [14]$$

where λ is a filter parameter which rejects noise in the system. The parameter λ ranges from 0 to 1 and is typically selected in consideration of process variance. For systems with high correlation in model residuals, a larger value (e.g., 0.7 to 1.0) of λ is typically used. In systems where natural variance dominates the correlation between residuals, a smaller value (e.g., 0.1 to 0.3) of λ is typically used. Using the process model above, an appropriate optimization equation may be determined and applied for controlling the downforce adjustments of the polishing arms.

Using the above control system, interactions between the polishing arms of a multi-arm polish tool are taken into account and arm-to-arm variations in removal rates are reduced as compared to conventional polish tool control techniques. Furthermore, by relying on production wafer data to control polishing, the above system provides a more efficient polishing process and improves wafer throughput. The use of a gating module adds deadband to the control system and further enhances control of the polish tool. However, if desired, a gating module may be omitted.

As noted above, the present invention is applicable to the control of a any polishing tool having multiple arms. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art upon review of the present specification. The claims are intended to cover such modifications and devices.

We claim:

1. A method of controlling a polishing tool having multiple arms, comprising:
   determining a first removal rate for each arm based on a first wafer run;
   determining a downforce adjustment input for each arm based on a process model, for the arms, which relates a removal rate for a given arm to downforce adjustments on each of the arms and using each first removal rate; and
   providing the downforce adjustment input for each arm to the polishing tool for polishing a subsequent run.

2. The method of claim 1, wherein determining the downforce adjustment input includes minimizing an optimization equation based on the process model and predicted removal rates for the subsequent run.

3. The method of claim 2, wherein minimizing the optimization equation includes minimizing a variation in the predicted removal rates for the subsequent run.

4. The method of claim 3, wherein the variation in predicted removal rates is minimized subject to one or more constraints.

5. The method of claim 4, wherein one of the constraints binds, for each arm, the downforce adjustment between a lower bound and an upper bound.

6. The method of claim 4, wherein one of the constraints requires the sum of the downforce adjustments for all of the arms to be zero.

7. The method of claim 1, wherein each run includes one or more batches of wafers.

8. The method of claim 7, wherein determining the first removal rate for each arm includes averaging individual removal rates for each arm over multiple batches of wafers.

9. The method of claim 1, wherein determining the first removal rate for each arm further includes:
   providing a topology factor associated with a layer of each wafer of a run; and
   using each topology factor to determine the first removal rate.

10. The method of claim 1, wherein the process model is:

$$R_{k+1}=R_k+K\Delta F_k$$

where $R_{k+1}$ is a vector representing predicted removal rates for a run k+1, $R_k$ is a vector representing removal rates at a run k, $\Delta F_k$ is a vector representing downforce adjustments for run k, and K is a matrix of coefficients relating arm removal rates to arm downforce adjustments.

11. A controller for controlling a polishing tool having multiple arms, comprising:
   means for determining a first removal rate for each arm based on a first wafer run;
   means for determining a downforce adjustment input for each arm based on a process model, for the arms, which relates a removal rate for a given arm to downforce adjustments on each of the arms and using each first removal rate; and
   means for providing the downforce adjustment input for each arm to the polishing tool for polishing a subsequent run.

12. The controller of claim 11, wherein means for determining the downforce adjustment input includes means for minimizing an optimization equation based on the process model and predicted removal rates for the subsequent run.

13. The controller of claim 12, wherein means for minimizing the optimization equation includes means for minimizing a variation in the predicted removal rates for the subsequent run.

14. The method of claim 11, wherein means for determining the first removal rate for each arm includes means for averaging individual removal rates for each arm over multiple batches of wafers.

15. The controller of claim 11, wherein means for determining the first removal rate for each arm further includes means for using a topology factor associated with a layer of each wafer of a run to determine the first removal rate.

16. The controller of claim 11, wherein the process model is:

$$R_{k+1}=R_k+K\Delta F_k$$

where $R_{k+1}$ is a vector representing predicted removal rates for a run k+1, $R_k$ is a vector representing removal rates at a run k, $\Delta F_k$ is a vector representing downforce adjustments for run k, and K is a matrix of coefficients relating arm removal rates to arm downforce adjustments.

17. A controller for controlling a polishing tool having multiple arms, comprising:
   an optimizer for determining a downforce adjustment input for each arm based on a process model, for the arms, which relates a removal rate for a given arm to downforce adjustments on each of the arms using each removal rates for the arms; and
   an interface for providing the downforce adjustment input for each arm to the polishing tool for polishing a run of wafers.

18. The controller of claim 17, wherein the optimizer determines the downforce adjustment input by minimizing an optimization equation based on the process model and predicted removal rates for the subsequent run.

19. The controller of claim 18, wherein the optimizer minimizes the optimization equation by minimizing a variation in the predicted removal rates for the subsequent run.

20. The controller of claim 17, wherein the optimizer determines the first removal rate for each arm by averaging individual removal rates for each arm over multiple batches of wafers.

21. The controller of claim 17, wherein the optimizer determines the first removal rate for each arm using a topology factor associated with a layer of each wafer of a run.

22. The controller of claim 17, wherein the process model is:

$$R_{k+1}=R_k+K\Delta F_k$$

where $R_{k+1}$ is a vector representing predicted removal rates for a run k+1, $R_k$ is a vector representing removal rates at a run k, $\Delta F_k$ is a vector representing downforce adjustments for run k, and K is a matrix of coefficients relating arm removal rates to arm downforce adjustments.

23. A polishing system, comprising:
   a polishing tool having multiple arms;
   one or more measuring tools, connected to the polishing tool, for measuring pre-polish thicknesses and post-polish thicknesses of layers on wafers;
   a controller coupled to the polishing tool and the one or more measuring tools configured to;

receive measured pre-polish thicknesses and post-polish thicknesses of wafers of a first wafer run and determine a removal rate for each arm using the measured pre-polish and post-polish thicknesses;

determine a downforce adjustment input for each arm based on a process model, for the arms, which relates a removal rate for a given arm to downforce adjustments on each of the arms and using each first removal rate; and provide the downforce adjustment input for each arm to the polishing tool for polishing a subsequent run.

24. The polishing system of claim 23, wherein the controller determines the downforce adjustment input by minimizing an optimization equation based on the process model and predicted removal rates for the subsequent run.

25. The polishing system of claim 23, wherein the controller minimizes the optimization equation by minimizing a variation in the predicted removal rates for the subsequent run.

26. The polishing system of claim 23, wherein the controller determines the first removal rate for each arm by averaging individual removal rates for each arm over multiple batches of wafers.

27. The polishing system of claim 23, wherein the controller determines the first removal rate for each arm further using a topology factor associated with a layer of each wafer of a run.

28. The polishing system of claim 23, wherein the process model is:

$$R_{k+1} = R_k + K \Delta F_k$$

where $R_{k+1}$ is a vector representing predicted removal rates for a run k+1, $R_k$ is a vector representing removal rates at a run k, $\Delta F_k$ is a vector representing downforce adjustments for run k, and K is a matrix of coefficients relating arm removal rates to arm downforce adjustments.

* * * * *

UNITED STATES PATENT AND TRADEMARK OFFICE
CERTIFICATE OF CORRECTION

PATENT NO.    : 6,171,174 B1
DATED         : January 9, 2001
INVENTOR(S)   : Campbell et al.

It is certified that error appears in the above-identified patent and that said Letters Patent is hereby corrected as shown below:

Drawings,
Fig. 7: the head of the vertical arrow at the top of the 712 box should be directed upward.

Signed and Sealed this

Eleventh Day of March, 2003

JAMES E. ROGAN
*Director of the United States Patent and Trademark Office*